Figure 1:
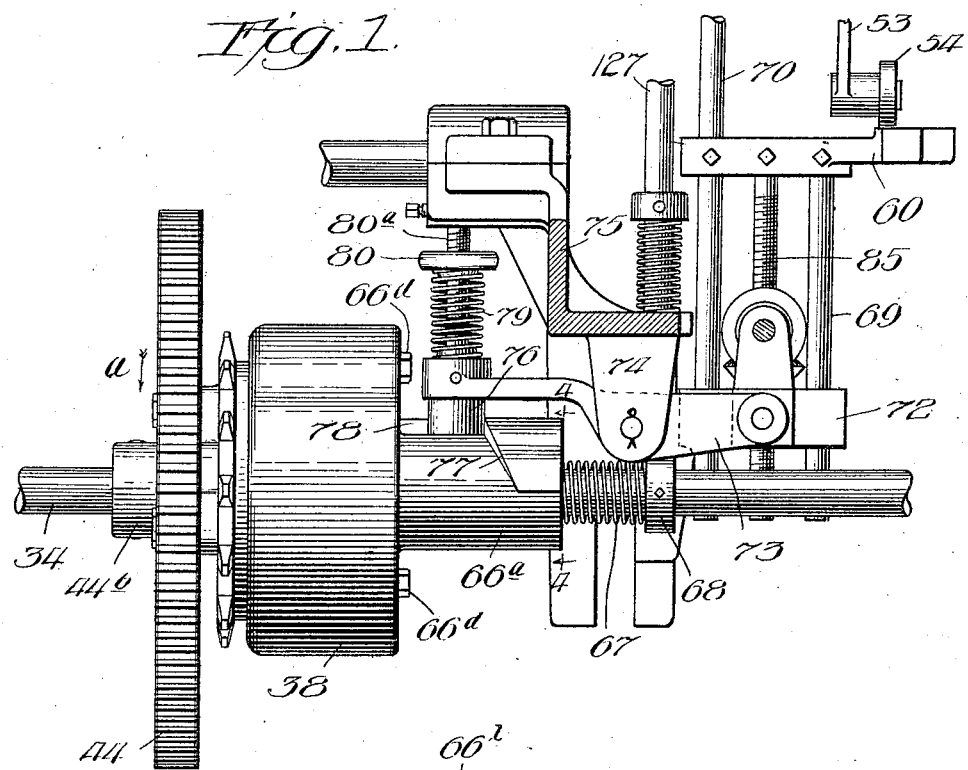

P. B. STREICH.
DOUGH SCALING MACHINE.
APPLICATION FILED APR. 8, 1918.

1,323,727.

Patented Dec. 2, 1919.

2 SHEETS—SHEET 1.

Witness:
Harry S. Gaither

Inventor
Paul B. Streich
by Charles O. Thurvey
Atty

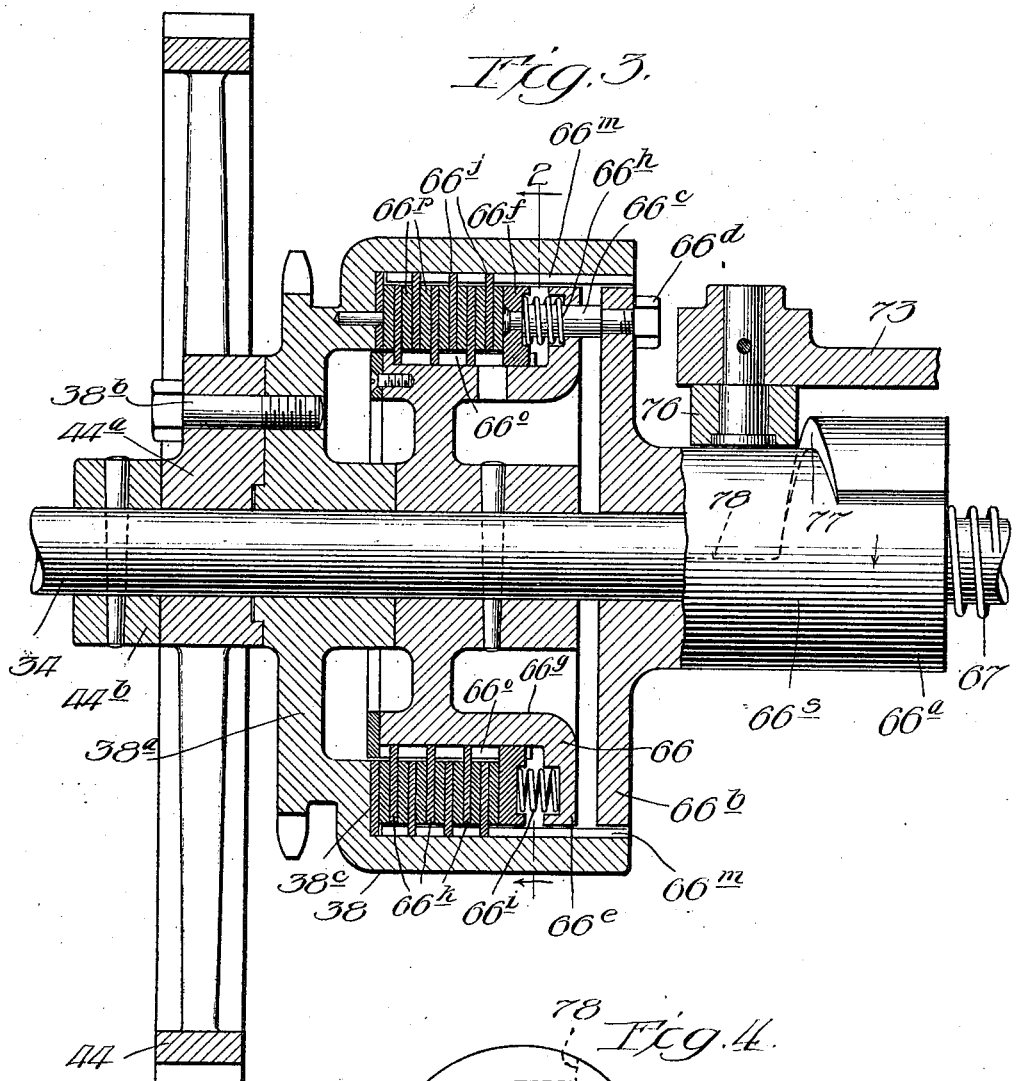
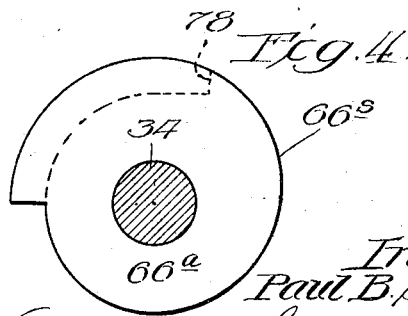

UNITED STATES PATENT OFFICE.

PAUL B. STREICH, OF JOLIET, ILLINOIS, ASSIGNOR TO THE UNION WRAPPING MACHINE COMPANY, OF JOLIET, ILLINOIS, A CORPORATION OF ILLINOIS.

DOUGH-SCALING MACHINE.

1,323,727.

Specification of Letters Patent.

Patented Dec. 2, 1919.

Application filed April 8, 1918. Serial No. 227,202.

*To all whom it may concern:*

Be it known that I, PAUL B. STREICH, a citizen of the United States, and a resident of Joliet, county of Will, and State of Illinois, have invented certain new and useful Improvements in Dough-Scaling Machines, of which the following is declared to be a full, clear, and exact description.

This invention relates to dough scaling machines, and more particularly to means for coupling a continuously driven member of the machine to an intermittently driven member. This invention is in the nature of an improvement upon that feature of a dough scaling machine shown and described in my prior application for patent on dough scaling machines, Serial No. 222,995, filed March 18, 1918.

The primary object of the present invention is to provide coupling means between the continuously rotating member and the intermittently rotated member, which shall respond instantly to the tripping mechanism which controls the coupling mechanism, to thereby insure a more accurate weighing of the dough. In machines of the type described in my prior application, above referred to, the tripping mechanism is actuated by the combined expansion of the dough and weight thereof on scale plates, located in pockets of an intermittently rotated table, which scale plates trip the tripping mechanism and set in motion the means for intermittently rotating the table. In said prior application, a toothed clutch is illustrated between the continuously rotating member and intermittently rotated member, but occasionally, when the two clutch members are thrown together, the clutch teeth do not interlock instantly, thereby permitting the table to remain stationary for an instant longer than it should, which permits a greater amount of dough to be fed into the pockets than is required. With the present invention, the clutch acts instantaneously when the tripping mechanism is actuated, thereby enabling the machine to weigh more accurately.

With this and other objects in view, this invention consists in the several novel features hereinafter set forth and more particularly defined in the claims.

The invention is clearly illustrated in the drawings accompanying this specification, in which:—

Figure 2:
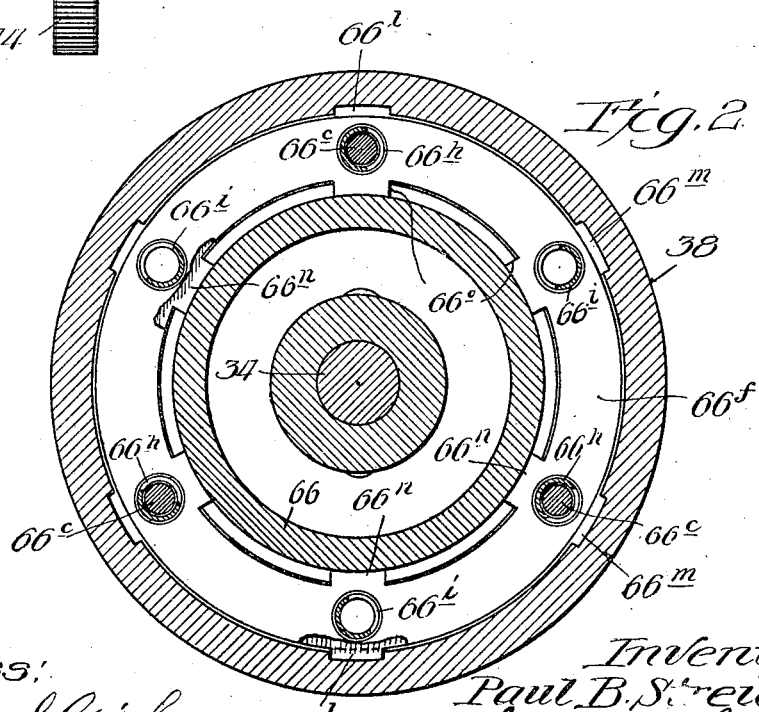

Figure 1, is a side elevation of the tripping mechanism and clutch device of the present invention, and showing in cross section a member of the frame work of the machine; Fig. 2, is a detail, vertical cross section taken on the line 2—2 of Fig. 3; Fig. 3, is a central, vertical, longitudinal section taken through the clutch mechanism seen in Figs. 1 and 2, and Fig. 4, is a detail cross section taken on the line 4—4 of Fig. 1. Fig. 1, shows the position occupied by the parts when the intermittently rotated shaft is at rest, and Fig. 3, shows the parts in a position occupied immediately before the clutch is thrown out.

Referring to said drawings, the reference character 75, designates a transverse member of the frame of a dough scaling machine of the type illustrated in my prior application above referred to. A continuously rotating member is here shown as comprising gear wheel 44, which gear wheel corresponds with the gear wheel 44, of my prior application, and is driven from an electric motor (not shown). Said gear wheel 44, is rotatively mounted upon an intermittently rotated shaft 34, journaled in suitable bearings (not shown), carried by the frame of the machine. A collar 44<sup>b</sup>, pinned to the shaft, takes up the end thrust on the gear wheel 44. The shaft 34, is geared to the table supporting shaft (not shown) of the machine, and intermittently rotates said shaft and table for the purposes set forth in my prior application.

Fixedly secured to the gear wheel 44, is one member 38, of the clutch, and fixedly secured to the shaft 34, is a second member 66, of the clutch. The clutch member 38, is hollow and has an end wall 38$^a$, which is bolted, by bolts 38$^b$, to the hub 44$^a$, of the gear wheel 44, or it may be secured to said gear wheel in any other convenient manner. Slidably mounted upon the shaft 34, is a sleeve 66$^a$, which is formed at one end with a disk-like head or flange 66$^b$, which enters the open end of the clutch member 38, and is connected with the clutch member 66, to rotate in unison therewith, although the sleeve has a limited amount of lengthwise movement along the shaft 34. Said connecting means, as here shown to comprise a plurality of pins 66$^c$, secured in the head 66$^b$, and having nuts 66$^d$, on their ends for fixedly securing them in place. The pins 66$^c$, extend through a radial flange 66$^e$, formed on the clutch member 66, and are secured to a ring 66$^f$, that surrounds the cylindrical portion 66$^g$, of the clutch member 66. Coiled compression springs 66$^h$, surround the pins 66$^c$, and are seated in depressed portions in the opposing faces of the flange 66$^e$, and ring 66$^f$. Other coiled compression springs 66$^i$, are seated in opposing depressions formed in said flange 66$^e$, and ring 66$^f$, and all of said coiled compression springs tend to yieldingly press the ring 66$^f$, and sleeve 66$^a$, toward the left, as viewed in Fig. 3. Between the ring 66$^f$, and the end face 38$^c$, of the clutch member 38, are a number of disks or rings 66$^j$, 66$^k$. The disks 66$^j$, rotate with the clutch member 38, and the disks 66$^k$, rotate with the clutch member 66, and, as shown, said disks 66$^j$, are formed with tongues 66$^l$, that extend into lengthwise extending grooves 66$^m$, formed in the inner face of the cylindrical portion of the clutch member 38. The disks 66$^k$, also are formed with tongues 66$^n$, that extend into lengthwise extending grooves 66$^o$, that are formed on the external face of the cylindrical portion 66$^g$, of the clutch member 66. Between the disks 66$^j$, 66$^k$, are friction rings 66$^p$, which may be secured to either set of disks 66$^j$, 66$^k$. The ring 66$^f$, is also formed with tongues 66$^n$, which enter grooves 66$^o$.

The sleeve 66$^a$, is formed with a spirally shaped shoulder 77, which extends around the cylindrical face of the sleeve and terminates in a shoulder 78, that runs parallel with the axis of the shaft. A trip lever 73, fulcrumed on brackets 74, of the frame member 75, has a roller 76, which is arranged to engage the shoulders 77, 78, and the roller carrying end of said lever is yieldingly held in contact with said sleeve 66$^a$, by a coiled compression spring 79, the upper end of which bears against an adjustment nut 80, threaded on a screw threaded stem 80$^a$, which extends down from the frame member 75. The other end of the lever 73, is connected to a trip block 60, by any suitable means, as, for instance, a block 72, and rods 69, 70, 85, as shown in my prior application, above referred to. In accordance with said application, the trip block 60, forms part of a continuous circular track upon which run rollers, one of which is shown at 54, that support the scale plates in the pockets of the table. A bracket 53, is shown, which connects the roller and scale plate. If desired, a spring 67, may be interposed between the sleeve 66$^a$, and a collar 68, fast on the shaft 34, in addition to the springs 66$^h$, 66$^i$, for causing frictional contact between the friction disks, or said spring 67, may be employed for this purpose and the springs 66$^h$, 66$^i$, omitted.

An upwardly pressed rod 127, is illustrated, which forms no part of this invention, but acts in conjunction with the feed roller carrying frame, shown in my prior application, to prevent movement of the tripping mechanism when said frame is raised.

In the operation of the device, the continuously rotating gear wheel 44, is driven in the direction of the arrow, $a$, in Fig. 1. The shaft 34, remains stationary so long as the roller 76, is in engagement with the shoulder 77, of the sleeve 66$^a$, because the friction disks 66$^j$, run freely between the disks 66$^k$. As soon as the proper amount of dough has been admitted to a pocket, the scale plate therein is depressed by the dough and the trip block is moved downward, thereby turning the lever 73, upon its fulcrum, and lifting the roller 76, up above the shoulders 77, 78, permitting the spring 67, to move the sleeve 66$^a$, toward the left, as viewed in Fig. 1. The instant the sleeve is released from the lever 73, and is moved by the spring 67, the springs 66$^h$, 66$^i$, clamp the friction disks 66$^j$, 66$^k$, together, and the clutch members 38, 66, are thereby instantaneously coupled together to rotate in unison, and the shaft 34, caused to rotate with the gear wheel 44. This rotation continues as long as the sleeve 66$^a$, is held in its extreme position toward the left, although in case the table is positively prevented from turning, by any accidental cause, the friction disks will slip upon each other and prevent breakage of any of the parts. As soon as the roller 54, runs off the trip block 60, the spring 79, forces down the roller carrying end of the lever 73, and the roller 76, thereupon rides upon the eccentric surface 66$^s$, of the sleeve 66$^a$, and when said sleeve approaches the end of one revolution, the inclined, or spiral shaped shoulder 77, thereof engages with the roller 76, and as said inclined shoulder runs along the roller 76, the sleeve is shifted toward the right, as viewed in Fig. 3, thereby removing the friction between the disks and disconnecting the continuously rotating portion 38, from the intermittently rotated portion 66. The timing is such that when the shaft 34, has made one complete revolution, the shoulder 78, comes into contact with the roller 76.

With the use of a multiple disk friction clutch between the continuously rotating element and the intermittently rotated element, the coupling together of the two is practically instantaneous whenever the trip lever is moved out of engagement with the sleeve. This insures a correct weight of each lump of dough that is fed into the pockets of the table. Furthermore, in case the table is positively prevented from rotating, no harm will be done to the mechanism, because of the possibility of slippage in the friction clutch.

More or less variation of the exact details of construction is possible without departing from the spirit of this invention; I desire, therefore, not to limit myself to the exact form of the construction shown and described, but intend in the following claims to point out all of the invention disclosed herein.

I claim as new, and desire to secure by Letters Patent:

1. In a dough scaling machine, the combination of a continuously rotating member, an intermittently rotated member, a friction clutch, one part of which is fixedly secured to the continuously rotating member, and one part to the intermittently rotated member, an endwise movable sleeve connected to rotate with said second mentioned part of the clutch, automatic means for instantaneously forcing the friction members of the clutch into frictional contact, and a tripping lever coöperating with said sleeve to releasably hold the friction elements of the clutch out of frictional contact, the sleeve having means engaging said tripping lever for automatically retracting the sleeve from the clutch to thereby release the frictional elements from frictional engagement.

2. In a dough scaling machine, the combination of a continuously rotating member, an intermittently rotated member, coupling mechanism therebetween comprising a multiple disk friction clutch, one part of which is fast to the continuously rotating member and one part of which is fast to the intermittently rotated member, an endwise movable sleeve connected to rotate with said second mentioned part of the clutch, automatic means for instantaneously forcing the disks of the clutch into frictional contact, and a tripping lever coöperating with said sleeve to releasably hold the friction disks of the clutch out of frictional contact, said sleeve having means engaging said tripping lever for automatically retracting the sleeve to thereby release the friction disks from frictional engagement with each other.

3. In a dough scaling machine, the combination of a continuously rotating member, an intermittently rotated member, a multiple disk friction clutch having one part rigidly secured to the continuously rotating member and one part rigidly secured to the intermittently rotated member, mechanically operated means, including springs for forcing the disks into frictional contact, a longitudinally, movable sleeve, connected with the second mentioned part of the clutch and having a circumferential, spirally arranged shoulder, and a spring-pressed tripping lever having a member lying in the path of movement of said shoulder and arranged to retract the disk disengaging sleeve.

4. In a dough scaling machine, the combination of a continuously rotating member, an intermittently rotated member, a multiple disk friction clutch, one part of which is rigidly secured to the continuously rotating element and the second mentioned part to the intermittently rotated member, means for causing frictional contact between the disks of the clutch, an endwise movable sleeve connected to said second mentioned part of the clutch to rotate therewith when in one position, said sleeve having a circumferential, spirally formed shoulder, and a mechanically operated tripping lever having a roller lying in the path of movement of said shoulder, whereby the sleeve is retracted when the shoulder moves past said roller, said lever acting to releasably hold the sleeve in retracted position.

5. In a dough scaling machine, the combination of a continuously rotating member, an intermittently rotated member, a multiple disk friction clutch, one part of which is rigidly secured to the continuously rotating member and the second mentioned part to the intermittently rotated member, means for causing frictional contact between the disks of the clutch when in one position, an endwise movable sleeve connected to said second mentioned part of the clutch to rotate therewith, said sleeve having a circumferential, spirally formed shoulder, a mechanically operated tripping lever having a roller lying in the path of movement of said shoulder, whereby the sleeve is retracted when moving past said roller, and a spring for yieldingly holding said roller in contact with said sleeve.

6. In a dough scaling machine, the combination of a continuously rotating clutch member, an intermittently rotated clutch member, a driven shaft upon which said second named clutch member is fixedly mounted, said clutch members comprising part of a multiple disk friction clutch, springs arranged to force the friction disks of the clutch into frictional engagement, a sleeve slidably mounted on said shaft and connected to said second named clutch member to rotate therewith, a circumferential, spirally arranged shoulder on said sleeve, and a mechanically operated tripping lever having a roller lying in the path of movement of said shoulder; substantially as and for the purpose set forth.

7. In a dough scaling machine, the combination of a continuously rotating member, an intermittently rotated shaft, a multiple disk friction clutch, one member of which is rigidly secured to said continuously rotating member, and another member of which is rigidly secured to said shaft, a disk engaging ring, springs for pressing said ring against the disks, a sleeve connected to said second named member of the clutch and ring to rotate therewith, said sleeve having a circumferential, spirally arranged shoulder, and a mechanically operated tripping lever having a roller lying in the path of movement of said shoulder, and coöperating therewith to retract the sleeve and therewith release the friction disks from frictional engagement.

8. In a dough scaling machine, the combination of a continuously rotating member, an intermittently rotated shaft, a multiple disk friction clutch, one member of which is rigidly secured to said continuously rotating member, and another member of which is rigidly secured to said shaft, a disk engaging ring, springs for pressing said ring against the disks, a sleeve slidably mounted on said shaft, pins secured to said sleeve and extending through said second named member of the clutch and secured to said ring, said sleeve having a circumferential, spirally arranged shoulder, and a mechanically operated tripping lever having a roller lying in the path of movement of said shoulder, and coöperating therewith to retract the sleeve and therewith release the friction disks from frictional engagement.

9. In a dough scaling machine, the combination of a continuously rotating clutch member, an intermittently rotated clutch member having a radial flange, a driven shaft upon which said second named clutch member is fixedly mounted, said clutch members comprising part of a multiple disk friction clutch, a spring-pressed sleeve slidably mounted on said shaft and formed with a radial flange, pins secured in said flange and extending through said flange of the intermittently rotated clutch member, a spring-pressed ring secured to said pins and adapted to bear against the disks of the clutch, a circumferential, spirally arranged shoulder on said sleeve, and a mechanically operated tripping lever having a roller lying in the path of movement of said shoulder; substantially as and for the purpose set forth.

PAUL B. STREICH.